No. 41,712. PATENTED FEB. 23, 1864.
W. C. MARSHALL.
MODE OF PRESERVING CHOPPED MEATS, &c.
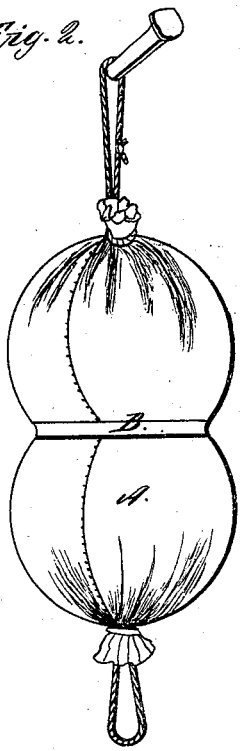
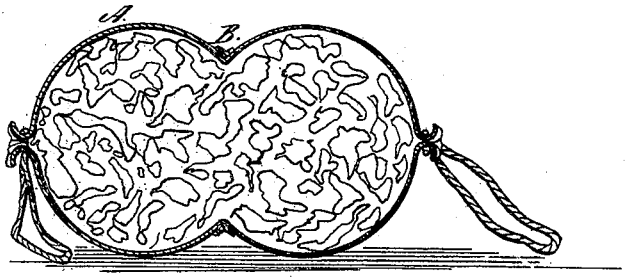

UNITED STATES PATENT OFFICE.

W. C. MARSHALL, OF NEW YORK, N. Y.

IMPROVED MODE OF PRESERVING CHOPPED MEATS, &c.

Specification forming part of Letters Patent No. 41,712, dated February 23, 1864.

*To all whom it may concern:*

Be it known that I, W. C. MARSHALL, of the city, county, and State of New York, have invented a new and Improved Method of Preserving Animal Flesh; and I do hereby declare that the following is a full, clear, and exact description of my invention, reference being had to the accompanying drawings, forming a part of this specification, in which—

Figure 1 represents a longitudinal vertical section of my invention. Fig. 2 is a plan or top view of the same.

Similar letters of reference in both views indicate corresponding parts.

This invention consists in the employment or use of cylindrical tubes, made of cotton or other textile fabrics and tied up at the ends, like sausages, in such a manner that said tubes take the place of the intestines generally used in the manufacture of sausages, and that dry desiccated meat, chopped or reduced to more or less fineness, can be preserved with a saving in labor equal to fifty per cent. of that ordinarily required.

The invention consists, also, in the application to said cylindrical tubes, after they have been filled with meat and tied at the ends, of elastic bands, made of india-rubber or other suitable material and embracing the tubes at short intervals in such a manner that by the action of the bands the covering tube is always drawn up tight to the meat, and no retying of the bands is required as the meat shrinks and its bulk diminishes.

To enable those skilled in the art to make and use my invention, I will proceed to describe it.

A represents a cylindrical tube, made of cotton or other textile fabric, and having any desirable diameter, according to the nature and quantity of meat to be preserved. One end of this tube is tied by means of cord, so as to form a bag, and the meat is cut up or chopped to any desired degree of fineness and filled into the bag thus formed, and pressed in as tight as may be desirable. The open end of the bag is then tied by cord and the package is ready for preservation.

In order to compensate for the shrinkage of the meat, I apply to the tubes or bags, after the same have been filled and tied, elastic bands B, of india-rubber or other suitable material. One or more such bands must be applied to a bag, according to its length, and as the meat shrinks the bands automatically draw up the bag perfectly tight, and no retying is required.

By the use of my tubes or bags a considerable amount of labor is saved as compared with that required in the ordinary process of preserving meat, and after the bags have been once filled and tied and the elastic bands applied no further labor is needed. By these means I am enabled to reduce the cost of preserving dry desiccated meat to such an extent that the preservation of large quantities of such meat is rendered practicable.

What I claim as new, and desire to secure by Letters Patent, is—

1. The use of cylindrical tubes A, of cotton or other textile material, substantially such as herein described, for the purpose of preserving animal flesh or meat.

2. The application of elastic bands B to the bags A, after the same have been filled and tied, substantially as and for the purpose set forth.

W. C. MARSHALL.

Witnesses:
 D. ROBERTSON,
 THOS. S. J. DOUGLAS.